(12) United States Patent
Sawyers-Abbott et al.

(10) Patent No.: US 9,835,092 B2
(45) Date of Patent: Dec. 5, 2017

(54) SEALS FOR GAS TURBINE ENGINE NACELLE COWLINGS

(71) Applicant: UNITED TECHNOLOGIES CORPORATION, Farmington, CT (US)

(72) Inventors: Nigel D. Sawyers-Abbott, South Glastonbury, CT (US); Gregory E. Reinhardt, South Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 135 days.

(21) Appl. No.: 14/788,135

(22) Filed: Jun. 30, 2015

(65) Prior Publication Data

US 2017/0002746 A1     Jan. 5, 2017

(51) Int. Cl.
    *F02C 7/28*     (2006.01)
    *F02C 7/20*     (2006.01)
    (Continued)

(52) U.S. Cl.
    CPC .............. *F02C 7/28* (2013.01); *F01D 11/02* (2013.01); *F01D 25/24* (2013.01); *F02C 7/12* (2013.01);
    (Continued)

(58) Field of Classification Search
    CPC ...... F02C 7/28; F02C 7/12; F02C 7/18; F02C 7/24; F02C 7/25; F02C 7/20; F05D 2240/55; F05D 2260/203; F05D 2260/20; F05D 2260/608; F05D 2260/602; F01D 25/12; F01D 25/14; F01D 25/32; F02K 1/822

See application file for complete search history.

(56) References Cited

U.S. PATENT DOCUMENTS 4,804,310 A * 2/1989 Fuller ..................... F01D 11/16
                                                       415/115
6,122,892 A * 9/2000 Gonidec .................. B32B 3/12
                                                       428/116

(Continued)

FOREIGN PATENT DOCUMENTS

EP           2236772 A2    10/2010
FR           3001197 A1     7/2014
WO    2014197057 A2    12/2014

OTHER PUBLICATIONS

English Machine Translation to FR 3 001 197.
European Search Report for Application No. EP 16 17 7212.
English Translation to Abstract for FR 3001197.

*Primary Examiner* — Pascal M Bui Pho
*Assistant Examiner* — Thuyhang Nguyen
(74) *Attorney, Agent, or Firm* — Cantor Colburn LLP

(57) ABSTRACT

A gas turbine engine includes an engine core and core nacelle cowling coupled to the engine core. The engine core has a core member that extends radially outward from the engine core. The core nacelle cowling has a cowling member that extends radially inward towards the engine core. The cowling member is offset axially from the core member to form a labyrinth seal that bounds a coolant inlet, thereby fluidly coupling the fan duct flow of the gas turbine engine with a core compartment defined between the engine core and core nacelle cowling.

18 Claims, 4 Drawing Sheets

(51) Int. Cl.
*F02C 7/25* (2006.01)
*F02C 7/18* (2006.01)
*F01D 11/02* (2006.01)
*F01D 25/24* (2006.01)
*F02C 7/12* (2006.01)

(52) U.S. Cl.
CPC ................ *F02C 7/18* (2013.01); *F02C 7/20* (2013.01); *F02C 7/25* (2013.01); *F05D 2220/32* (2013.01); *F05D 2240/55* (2013.01)

(56) References Cited

U.S. PATENT DOCUMENTS

| | | | |
|---|---|---|---|
| 9,322,288 B2* | 4/2016 | Burd | F16J 15/54 |
| 2003/0140615 A1* | 7/2003 | Le Docte | F02K 1/64 |
| | | | 60/226.1 |
| 2014/0000279 A1 | 1/2014 | Brousseau et al. | |
| 2015/0260101 A1* | 9/2015 | Teia Dos Santos Medes Gomes | F01D 11/24 |
| | | | 60/39.091 |

* cited by examiner

SEALS FOR GAS TURBINE ENGINE NACELLE COWLINGS

BACKGROUND OF THE INVENTION

1. Field of the Invention

The present disclosure relates to gas turbine engines, and more particularly to nacelles for gas turbine engines.

2. Description of Related Art

Gas turbine engines commonly include a core disposed within a nacelle. The nacelle surrounds the core and typically includes one or more nacelle segments connected to the engine core. Penetrations in the nacelle typically allow air from the engine bypass duct to enter and flow through spaces defined between the engine nacelle and engine core for cooling components disposed therein. Nacelle segments may also be engaged to the engine core by latch mechanisms that allow selected nacelle segments to be unlatched and displaced from the engine core to provide access to components located between the nacelle and the engine core, such as during inspection or maintenance events. The latch mechanisms may be configured to keep the nacelle segments form separating from the engine core due to various load conditions, including mitigating loads and deflections that may be induced on the nacelle by the introduction of pressurized air into the spaces defined between the nacelle and engine. For example, leakage from bleed air conduits fluidly coupling the engine core with an aircraft environmental control system may pressurize spaces defined between the nacelle and core.

Such conventional methods and systems have generally been considered satisfactory for their intended purpose. However, there is still a need in the art for improved seal structures for interfaces between engine cores and nacelles that provide improved efficiency and/or acoustic performance. The present disclosure provides a solution for this need.

SUMMARY OF THE INVENTION

A gas turbine engine includes an engine core and core nacelle cowling coupled to the engine core. The engine core has a core member that extends radially outward from the engine core and the core nacelle cowling has a cowling member that extends radially inward towards the engine core. The cowling member is offset axially from the core member to form a labyrinth seal that bounds a coolant inlet fluidly coupling the engine bypass duct defined between the core compartment defined between the engine core and core nacelle cowling.

In certain embodiments, the core member and the cowling member can axially overlap one another to define a tortuous coolant flow path extending between core nacelle exterior and the core compartment. The cowling member can be adjacent to a forward edge of the nacelle cowling. The cowling member can be a forward cowling member, and the nacelle cowling can include an aft cowling member that bounds a coolant outlet of the core compartment. It is contemplated that the nacelle cowling can present a continuous surface to the core compartment with fewer ventilation or cooling penetrations extending between the inner and outer surfaces of the nacelle cowling than required in conventional engines.

In accordance with certain embodiments, the cowling member can be an inlet first cowling member and an inlet second cowling member can be disposed on a side of the core member opposite the inlet first cowling member. Each of the inlet first cowling member, the core member, and the inlet second cowling member can bound the coolant inlet. An outlet cowling member can be disposed on an aft end of the nacelle cowling. The core member can be an inlet first core member, and the core can include an inlet second core member that is disposed on a side of the inlet cowling member that is opposite the inlet first core member. Each of the inlet first core member, the cowling member, and the inlet second core member can bound the coolant inlet. An outlet core member can be disposed radially opposite the aft end of the nacelle cowling.

It is also contemplated that, in accordance with certain embodiments, a drain can be disposed on a lower surface of the cowling. The drain can be in fluid communication with the coolant inlet for draining entrained fluid, such as hydraulic fluid, from coolant entering the core compartment. The drain can be connected to a forward surface of the core member to receive liquid therefrom. Alternatively or additionally, the drain can be connected to a forward surface of the cowling member to receive liquid therefrom. The drain can extend below the engine core and through a bifurcation coupling a bypass nacelle to the engine core. It is further contemplated that the core compartment can contain a bleed conduit in fluid communication with the engine core, and that the labyrinth seal bounding the coolant inlet can provide pressure relief for leakage from the bleed conduit.

A gas turbine engine includes an engine core having a core member extending radially outward from the core, a core nacelle cowling coupled to the engine core and having a cowling member extending radially inward toward the core, and a bypass nacelle coupled to the engine core. The bypass nacelle circumferentially surrounds the core nacelle and defines a bypass duct between the bypass nacelle and core nacelle. The core nacelle and engine core define therebetween a core compartment with a coolant inlet bounded by a labyrinth seal as described above that fluidly couples the bypass duct with the core compartment.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
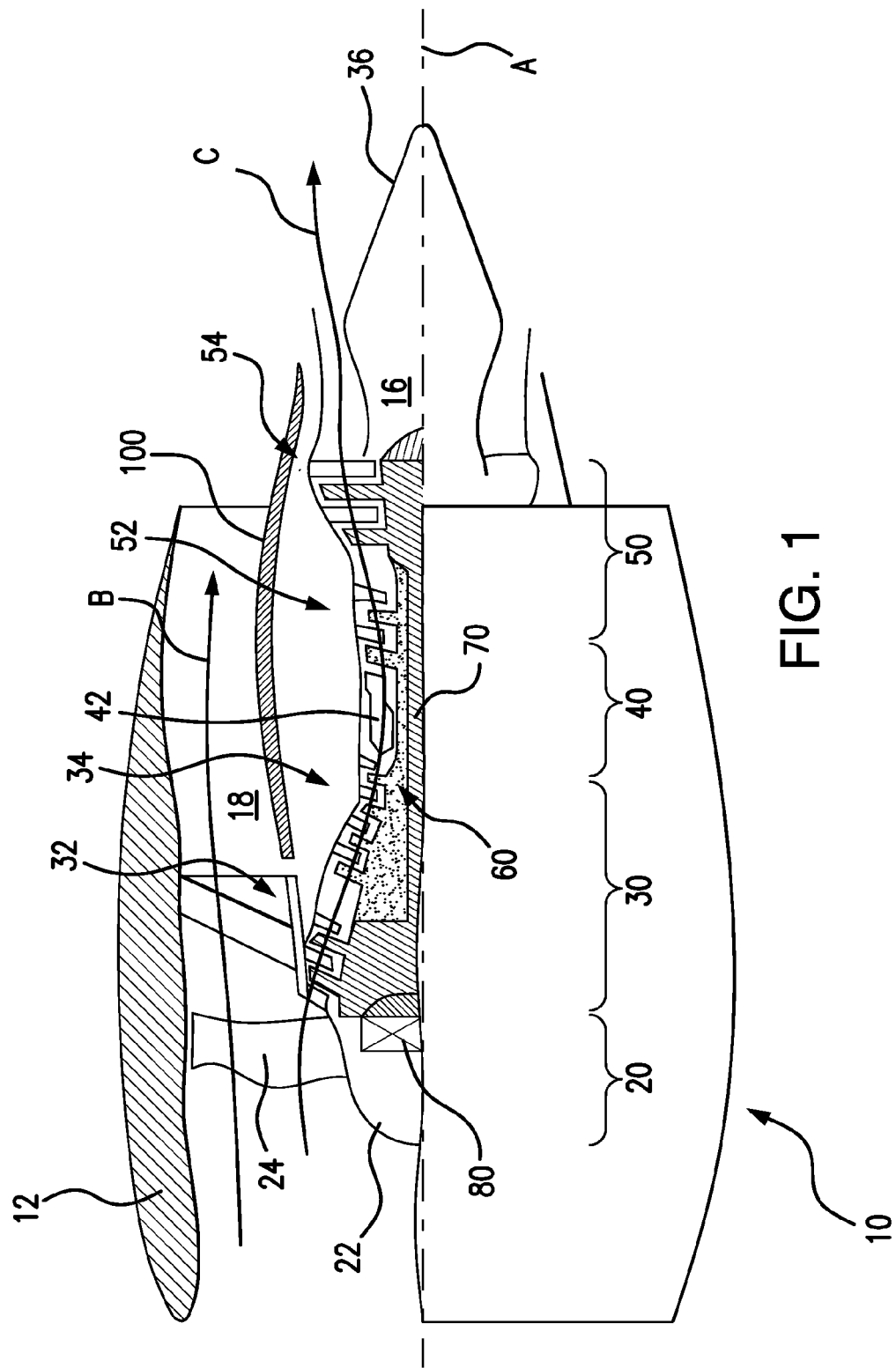
FIG. 1 is a schematic, partial cross-sectional view of an exemplary embodiment of a gas turbine engine constructed in accordance with the present disclosure, showing a nacelle cowling.

Reference will now be made to the drawings wherein like reference numerals identify similar structural features or aspects of the subject disclosure. For purposes of explanation and illustration, and not limitation, a partial view of an exemplary embodiment a nacelle cowling for a gas turbine engine in accordance with the present disclosure is shown in FIG. 1 and is designated generally by reference character 100. Other embodiments of cowlings, nacelles, and gar turbine engines in accordance with the disclosure, or aspects thereof, are provided in FIGS. 2-4, as will be described. The systems and methods described herein can be used in aircraft engines, such as auxiliary power units and main engines for aircraft.

Referring to FIG. 1, a gas turbine engine 10 is shown. Gas turbine engine 10 includes a bypass nacelle 12 and an engine core nacelle 16. Bypass nacelle 12 is disposed radially outward of engine core 16 relative to an engine longitudinal axis A, bypass nacelle 12 and engine core 16 defining therebetween a bypass duct 18. Engine core 16 includes core nacelle cowling 100 that couples to engine core 16. Engine core 16 includes a compressor section 30, a combustor section 40, and a turbine section 50 rotatably disposed along engine longitudinal axis A.

A fan section 20 with a fan 22 having fan blades 24 is operable connected to engine core 16 such that fan blades 24 are rotatably disposed within bypass duct 18 and within a bypass flow path B. Compressor section 30, combustor section 40, and turbine section 50 define within their interior a core flow path C. An inlet, disposed on a forward end of engine core 16, and an outlet, disposed on an aft end of engine core 16, are each fluid communication with core flow path C at opposite ends of gas turbine engine 10. Alternative engines might include an augmenter (not shown for clarity reasons) among other systems or features.

Compressor section 30 includes a low pressure compressor 32 and a high pressure compressor 34. Low pressure compressor 32 is in fluid communication with the engine core inlet and is configured for compressing fluid received from the ambient environment through the engine core inlet. High pressure compressor 34 is in fluid communication with low pressure compressor 32 and is configured to further compress fluid received from low pressure compressor 32.

Combustor section 40 includes at least one combustor 42. The at least one combustor 42 is in fluid communication with high pressure compressor 34 and is configured to ignite a mixture of fuel and compressed fluid received from high pressure compressor 34. Ignition of the fuel-compressed air mixture generates a flow of high pressure combustion products that combustor section 40 communicates to turbine section 50.

Turbine section 50 includes a high pressure turbine 52 and a low pressure turbine 54. High pressure turbine 52 is in fluid communication with combustor section 40 and receives therefrom the flow of high pressure combustion products, which it expands and from which it extracts work. Low pressure turbine 54 is in fluid communication with high pressure turbine 52 and is configured to received and further expand the high pressure combustion products, thereby extracting further work by further expanding the flow of combustion products.

High pressure turbine 52 and high pressure compressor 34 are operably connected to one another by a high pressure spool 60. This allows high pressure turbine 52 to apply the work extracted from the flow of combustion products to high pressure compressor 34 as rotational energy, powering high pressure compressor 34.

Low pressure turbine 54 and low pressure compressor 32 are operably connected to one another by a low pressure spool 70. This allows low pressure turbine 54 to apply the further work extracted from the flow of combustion products to low pressure compressor 32 as rotational energy, powering low pressure compressor 32. In the illustrated exemplary gas turbine engine 10, fan 22 is also operably connected to low pressure spool 70 through a gear architecture 80, thereby also receiving rotational energy from low pressure spool 70 for rotating fan blades 24 within bypass duct 18 within bypass duct 18.

Although the disclosed non-limiting embodiment depicts a turbofan gas turbine engine, it should be understood that the concepts described herein are not limited to use with turbofans and may be applied to other types of gas turbine engines. For example, a gas turbine engine may include a three-spool architecture in which three spools rotation concentrically about a common axis. A low pressure spool may enable a low pressure turbine to drive a fan via a gearbox, an intermediate spool may enable an intermediate pressure turbine to drive a first compressor of a compressor section, and a high pressure spool may enable a high pressure turbine to drive a high pressure compressor of the compressor section.

Gas turbine engine 10 is, in one example, a high-bypass geared aircraft engine. In a further example, gas turbine engine 10 includes a bypass ratio greater than about six (6), and in certain examples has a bypass ratio that is greater than about ten (10). Gear architecture 80 may be an epicyclical gear train, such as a planetary gear system, star gear system, or other gear system with a gear reduction ratio that is greater than about two (2).

Figure 2:
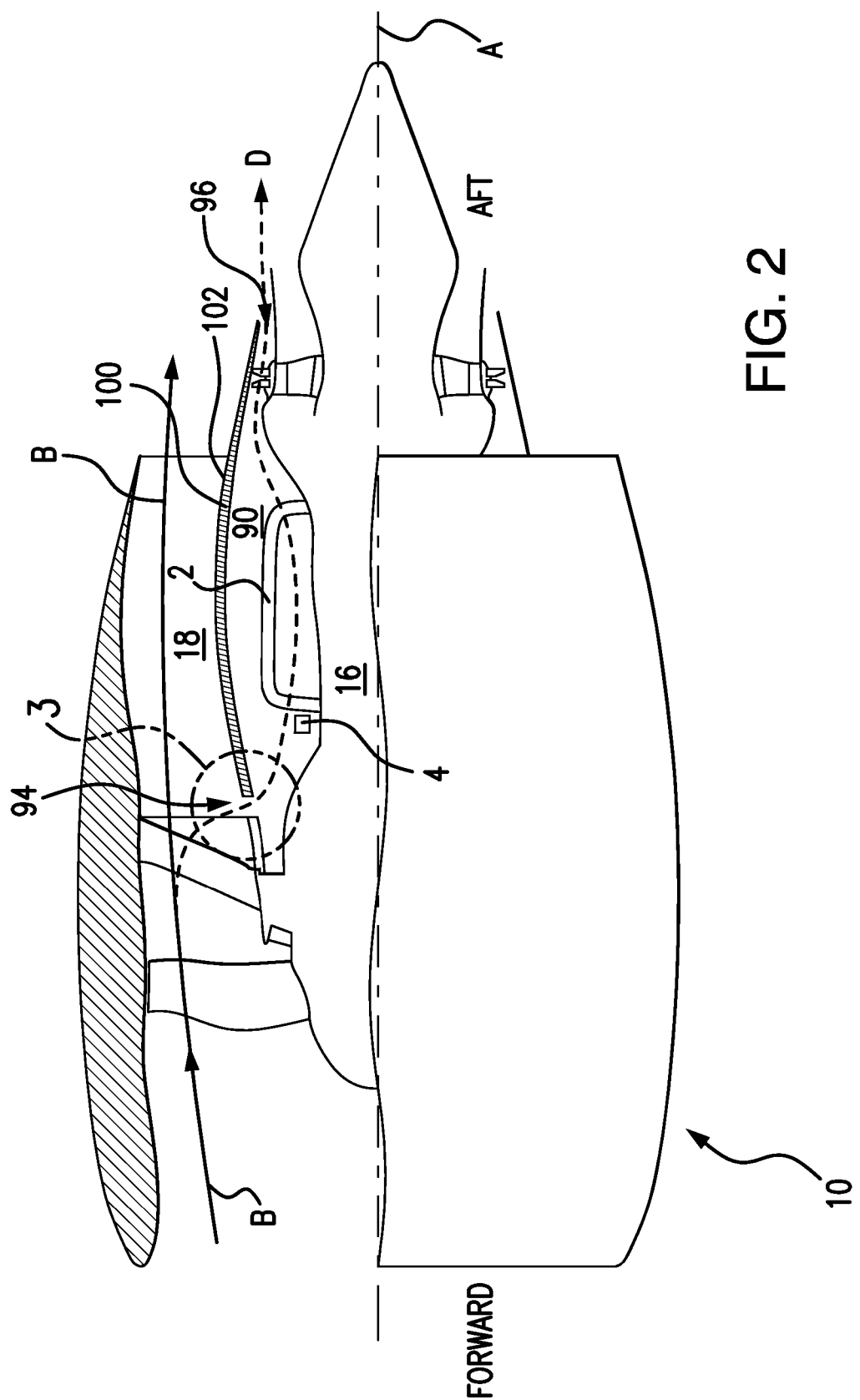
FIG. 2 is a schematic cross-sectional view of the gas turbine engine of FIG. 1, showing a core compartment defined between the nacelle cowling and the gas turbine engine core.

With reference to FIG. 2, a core compartment 90 of gas turbine engine 10 is shown. Core compartment 90 is defined between core nacelle cowling 100 and engine core 16. A coolant inlet 94 fluidly connects bypass duct 18 with core compartment 90 for admitting coolant, e.g. air from bypass duct 18, into an interior of core compartment 90. A coolant outlet 96 fluidly connects core compartment 90 to the external environment to discharge coolant from the interior of core compartment 90 to the environment external to gas turbine engine 10. This arrangement allows a portion of bypass flow B to enter core compartment 90, remove heat from one or more cooled components requiring cooling disposed therein, and exit core compartment 90 through coolant outlet 96 to dissipate the heat into the ambient environment.

Between coolant inlet 94 and coolant outlet 96 core nacelle cowling 100 presents a substantially contiguous surface 102 to bypass flow path B. In this respect contiguous surface 102 has fewer penetrations extending between its inner and outer surfaces than would otherwise be necessary to provide coolant flow into core compartment 90, improving efficiency. It may also improve the acoustic performance of gas turbine engine 10 by providing additional surface area upon which acoustic countermeasure structures may be arranged.

Various components may be disposed within core compartment 90. For example, one or more electrical components, heat exchangers, and/or fluid conduits may be disposed within core compartment 90. In the illustrated exemplary embodiment core compartment 90 houses a bleed air conduit 2 and a cooled engine component 4. Coolant inlet 94 is oriented to direct fluid toward cooled engine component 4 for reducing the mass of coolant necessary for cooling components disposed within core compartment 90.

Bleed air conduit 2 extends generally through core compartment 90 for conveying compressed air with a pressure greater than that of the interior of the core compartment 90. The fluid traversing bleed air conduit 2 may be provided as coolant to combustor section 40 and/or turbine section 50 for cooling components disposed exposed to high temperatures. The fluid may also (or alternatively) by provided to an aircraft environmental control system (not shown for clarity purposes). As will be appreciated, coolant inlet 94 also provides a pressure relief outlet in the event of pressurization of core compartment 90 due to bleed air leakage.

In embodiments, core compartment 90 may include a designated fire zone. As a designated fire zone, it may be necessary to prevent flammable liquids from entering core compartment 90. For example, it may be necessary to remove liquid entrained in coolant entering core compartment 90 through coolant inlet 94, such as hydraulic fluid or lubricant, which may be present in air traversing bypass flow path B. Certification may require an engine include provisions to prevent such liquids from entering portions of an engine designated as fire zones.

Figure 3:
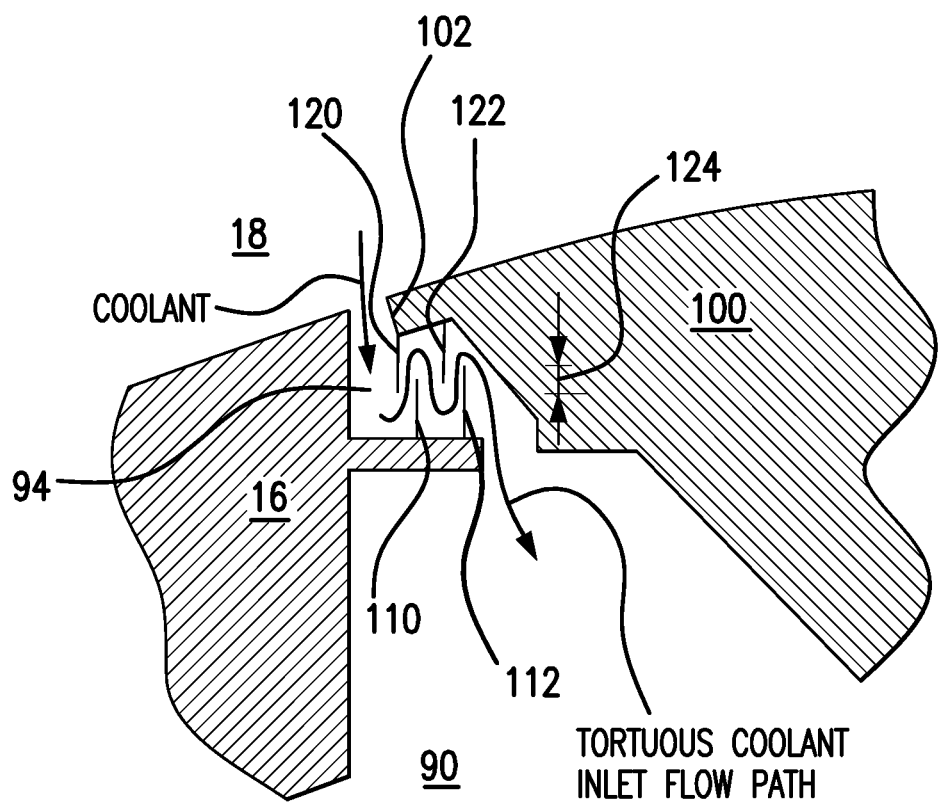
FIG. 3 is a schematic cross-sectional view of the core compartment illustrated in FIG. 2, showing a labyrinth seal bounding a coolant inlet opening into the core compartment.

With reference to FIG. 3, coolant inlet 94 is shown. Coolant inlet 94 includes a first core member 110, a second core member 112, a first cowling member 120, and a second cowling member 122 that form a labyrinth seal bounding coolant inlet 94. First core member 110 and second core member 112 are fixed to engine core 16. First cowling member 120 and second cowling member 122 are fixed to core nacelle cowling 100 such that the second cowling member 122 is interleaved between first core member 110 and second core member 112. First core member 110 is interleaved between first cowling member 120 and second cowling member 122. The interleaved members extend into coolant inlet 94 and overlap axially in an overlap area 124.

The labyrinth seal forming coolant inlet 94 provides pressure relief for core compartment 90. For example, in the event that bleed air conduit 2 issues compressed air into core compartment 90, the compressed air can exit core compartment 90 through coolant inlet 94. This reduces the force applied to nacelle cowling 100 by the pressurized fluid, reducing the resultant distortion or displacement of core nacelle cowling 100 associated with the force.

The labyrinth seal forming coolant inlet 94 can also remove entrained fluid from coolant entering core compartment 90. In this respect core and cowling members extend into the flow path between bypass duct 18 and core compartment 90 to define a tortuous coolant inlet flow path. Coolant, e.g. air, entering coolant inlet 94 changes direction. Because entrained fluid like oil or hydraulic fluid may be denser that the air conveying the entrained fluid, the fluid tends to impact the forward faces of the members forming the labyrinth seal, travels circumferentially about engine core 16 on the forward faces of the members, and collects at a lower portion of the engine below engine core 16. There the fluid can be collected or discharged, as suitable for a given engine design. This prevents fluid from entering core compartment 90, rendering core compartment 90 compliant with fire zone requirements.

As illustrated coolant inlet 94 includes four interleaved core and cowling members. This is for illustration purposes only and is non-limiting. In embodiments, coolant inlets described herein may include fewer than four core and cowling members, e.g. three core and cowling members. In certain embodiments, coolant inlets described herein may include more than four core and cowling members, as appropriate for a given application.

Figure 4:
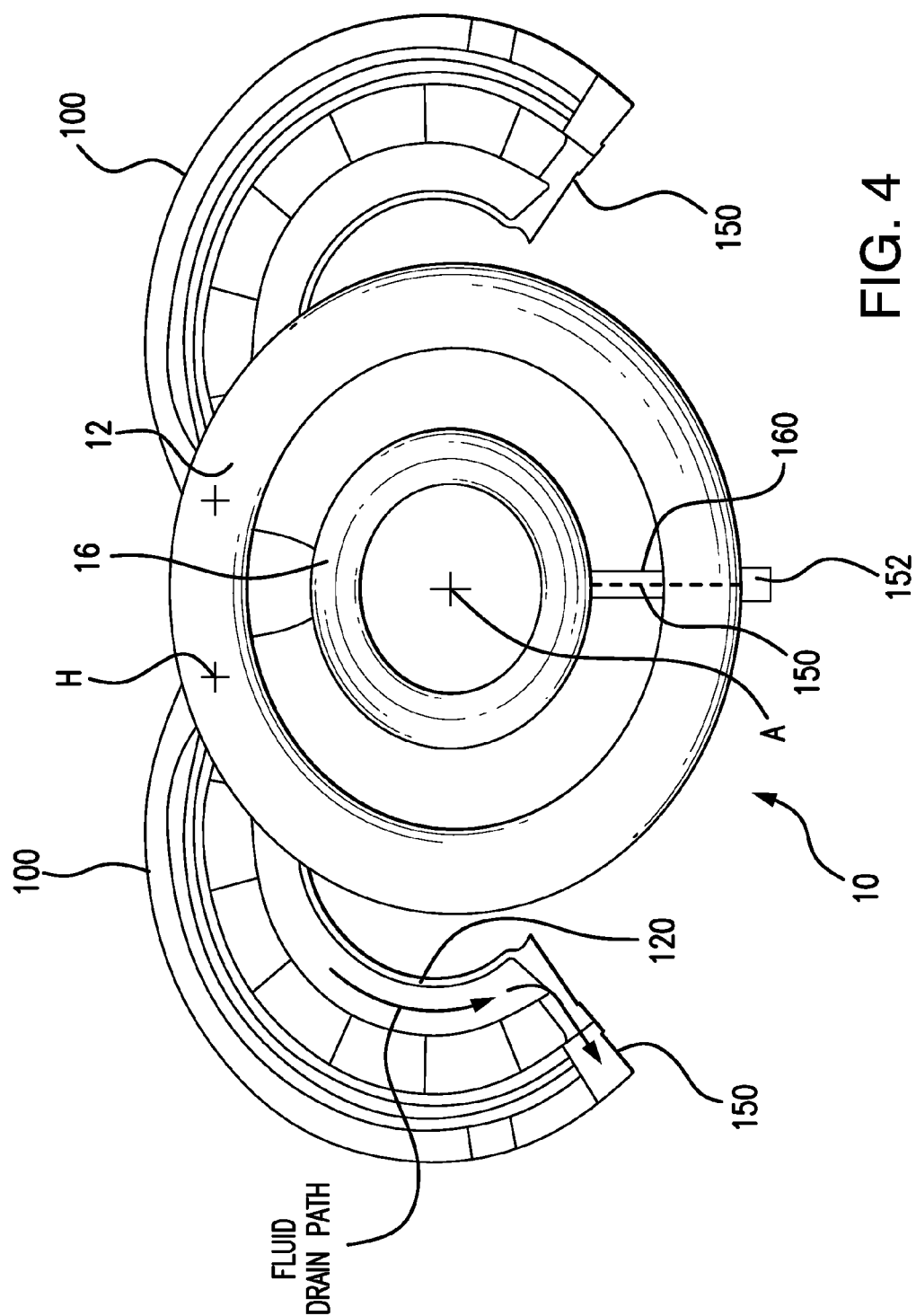
FIG. 4 is a schematic axial view of the gas turbine engine of FIG. 1, showing a drain structure formed by seal members of the coolant inlet.

With reference to FIG. 4, gas turbine engine 10 is shown in an axial end view. Core nacelle cowling 100 connects to an aircraft pylon at a hinge line H that extends longitudinally along engine core 16. Core nacelle cowling 100 includes a drain mast 150 which is connected to forward facing surfaces of the core and cowling seal members and extends downward from longitudinal axis A (relative to gravity when an aircraft mounting gas turbine engine 10 is in level flight) from lower portions of the core and cowling seal members. When in the closed position (shown in FIG. 3), fluid impacting the core and cowling forward facing surfaces flows circumferentially about engine core 16 along the surface following a path defined by the surfaces to drain mast 150, and thereafter enters a sump 152 disposed below engine core 16 or exits gas turbine engine 10 through a drain 154.

Some gas turbine engines can require core compartment ventilation. Ventilation is commonly provided through nacelle panel penetrations that extend between inner and outer surfaces of the nacelle cowlings. While satisfactory for their intended purpose, such penetrations may reduce efficiency (thrust specific fuel consumption), may reduce the area on the nacelle cowling available for acoustic countermeasure structures, and may allow entry of liquids entrained in coolant entering ventilated compartments in fluid communication with the bypass duct through the penetrations. The penetrations may also provide insufficient flow area for pressure relief to relieve core compartment pressure due to bleed air leakage.

Nacelles having coolant inlets with labyrinth seals as described herein provide a relatively large flow area, and can provide sufficient coolant flow for core compartment ventilation and provide pressure relief in the event that the core compartment pressurization. In embodiments, the nacelle cowling may be continuous, have fewer penetrations than conventional engines, thereby providing improved fuel consumption and area for acoustic countermeasure structures. In certain embodiments the core and nacelle members may be oriented to channel coolant towards specific regions of the core compartment, thereby allowing for targeting specific components disposed within the core compartment for cooling. The core and nacelle cowling members may also be configured to separate entrained liquids from coolant entering the core compartment, such as be conveying entrained fluid circumferentially about the engine core using gravity to a drain, facilitating compliance with fire zone requirements.

The methods and systems of the present disclosure, as described above and shown in the drawings, provide for core nacelles with superior properties including tolerance for core compartment overpressure events. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A gas turbine engine, comprising:
    an engine core;
    a core nacelle cowling coupled to the engine core, a core compartment with a coolant inlet defined between the core nacelle cowling and the engine core, and at least one component disposed within the core compartment, axially downstream of the coolant inlet; and wherein, the core nacelle cowling has a labyrinth seal bounding the coolant inlet, wherein the labyrinth seal is formed by:
- a plurality of axially spaced core members extending radially outward from the core; and
- a plurality of axially spaced cowling members extending radially inward from the core nacelle cowling and being interleaved with the plurality of axially spaced core members by axially and radially overlapping one another to define a tortuous coolant inlet flow path extending between a fan duct flow path and the core compartment; and wherein the coolant inlet is oriented to direct the tortuous coolant inlet flow path to the component.

2. A gas turbine engine as recited in claim 1, wherein the labyrinth seal includes a drain mast disposed on a nacelle cowling lower surface and in fluid communication with the coolant inlet.

3. A gas turbine engine as recited in claim 2, wherein the drain mast is connected to a forward facing surface of the plurality of axially spaced core members to receive liquid therefrom.

4. A gas turbine engine as recited in claim 2, wherein the drain mast is connected to a forward facing surface of the plurality of axially spaced cowling members to receive liquid therefrom.

5. A gas turbine engine as recited in claim 1, wherein the plurality of axially spaced cowling members is adjacent to a forward edge of the core nacelle cowling.

6. A gas turbine engine as recited in claim 1, further including a coolant outlet disposed aft of the coolant inlet at an aft end of the core nacelle cowling.

7. A gas turbine engine as recited in claim 1, wherein the plurality of axially spaced cowling members is an inlet first cowling member, and further including an inlet second cowling member disposed on a side of the plurality of axially spaced core members opposite the inlet first cowling member.

8. A gas turbine engine as recited in claim 7, wherein the inlet first cowling member, the plurality of axially spaced core members, and the inlet second cowling member bound the coolant inlet.

9. A gas turbine engine as recited in claim 7, further including a coolant outlet disposed at an aft end of the core nacelle cowling.

10. A gas turbine engine as recited in claim 1, wherein the plurality of axially spaced core members is an inlet first core member, and further including a second core member disposed on a side of the plurality of axially spaced cowling members opposite the inlet first core member.

11. A gas turbine engine as recited in claim 10, wherein the inlet first core member, the plurality of axially spaced cowling members, and the inlet second core member bound the coolant inlet.

12. A gas turbine engine as recited in claim 10, further including a coolant outlet disposed at an aft end of the core nacelle cowling.

13. A gas turbine engine as recited in claim 1, wherein the core nacelle cowling presents a continuous surface to the core compartment downstream of the coolant inlet.

14. A gas turbine engine of claim 1, further comprising a bypass nacelle coupled to the engine core and circumferentially surrounding the core nacelle cowling to define a bypass duct therebetween that is in fluid communication with the core compartment through the coolant inlet.

15. A gas turbine engine as recited in claim 14, further including an engine core bleed conduit in fluid communication with the engine core and disposed within the core compartment.

16. A gas turbine engine as recited in claim 14, further including a drain mast with a drain outlet in fluid communication with the labyrinth seal, the drain outlet disposed on an exterior of the bypass nacelle.

17. A gas turbine engine as recited in claim 14, further including a core compartment coolant outlet disposed aft of the coolant inlet.

18. A gas turbine engine as recited in claim 17, wherein the core nacelle cowling presents a continuous surface to the core compartment downstream of the coolant inlet.

* * * * *